United States Patent [19]

Lee

[11] Patent Number: 5,724,324
[45] Date of Patent: Mar. 3, 1998

[54] OPTICAL PICKUP ACTUATOR WITH AN OBJECTIVE LENS FIXING PART SUSPENDED BY AN ELASTIC MEMBERS

[75] Inventor: Kwang-Suk Lee, Seoul, Rep. of Korea

[73] Assignee: Daewoo Electronics Co., Ltd., Seoul, Rep. of Korea

[21] Appl. No.: 722,773

[22] Filed: Sep. 27, 1996

[30]     Foreign Application Priority Data

Sep. 29, 1995 [KR] Rep. of Korea .................. 95-32810

[51] Int. Cl.⁶ ............................................... G11B 7/00
[52] U.S. Cl. ............................................... 369/44.15
[58] Field of Search .......................... 369/44.14, 44.15, 369/44.16, 44.17, 44.18, 44.19, 44.21, 44.22; 359/813, 814, 823, 824

[56]              References Cited

U.S. PATENT DOCUMENTS

| | | | |
|---|---|---|---|
| 4,571,026 | 2/1986 | Maruta | 369/44.21 X |
| 4,838,649 | 6/1989 | Ichikawa et al. | 369/44.21 X |
| 5,218,483 | 6/1993 | Ikebe et al. | 369/44.15 X |
| 5,243,584 | 9/1993 | Kang | 369/44.14 |
| 5,323,378 | 6/1994 | Kim et al. | 369/44.16 X |
| 5,602,808 | 2/1997 | Futagawa et al. | 369/44.15 X |

FOREIGN PATENT DOCUMENTS 62-139132  6/1987  Japan ................... 369/44.21

*Primary Examiner*—Paul W. Huber
*Attorney, Agent, or Firm*—Beveridge, DeGrandi, Weilacher & Young LLP

[57]              ABSTRACT

In an optical pickup, a yoke of a supporting part has a flat bottom and both side walls upwardly bent at both ends thereof. Magnets are installed on inner surfaces of both side walls of yoke. Laser-penetrating hole is made in the plat botom and a guide projector are formed to the flat bottom. A spring is put around the guide projector. An objective lens fixing part is elastically supported by a spring in an inside of the yoke. In a main body of the objective lens fixing part, an objective lens and a through hole are installed in corresponding positions with the laser-penetrating hole and the guide projector, respectively. Coils are wound around side walls of the main body for tracking and focusing servos. The objective lens fixing part is elastically supported by the spring in a state that the guide projector is inserted into the through hole.

10 Claims, 3 Drawing Sheets

OPTICAL PICKUP ACTUATOR WITH AN OBJECTIVE LENS FIXING PART SUSPENDED BY AN ELASTIC MEMBERS

BACKGROUND OF THE INVENTION

1. Field of the Invention

The present invention relates to an optical pickup actuator. More particularly, the present invention relates to an optical pickup actuator which has a suspension using an elastic member for simplification of the construction and manufacturing process.

2. Description of the Prior Art

Data recording/reproducing apparatuses using optical disks such as a laser disk (LD) and a compact disk (CD) have been commercially available in recent years. In order to read out data from an optical disk, a laser beam is irradiated onto a data recording track (to be referred to as a "track" hereinafter), and data are reproduced based on the beam reflected by the track.

When the tracks are helically formed on the optical disk, since the sectors of a single track are not equidistant from the center of the rotation of the disk, tracking (radial) control is necessary in the read mode to accurately irradiate the track with a laser beam.

This tracking control has been conventionally performed by a one beam method or a three beam method. Tracking errors are detected from the laser beam reflected by an optical disk. Tracking control operation is conformed by transferring the objective lens in response to the tracking error signals derived by these tracking error signals. The objective lens is normally supported and fixed by a spring on an optical head housing. A tracking actuator is energized to move the lens for the tracking control. When the tracking actuator is deenergized, the lens is held at a mechanically neutral point balanced by a spring force.

Meanwhile, since the distance from the optical pickup to disk shifts minutely in the read mode in which the disk is rotated, it is difficult to correctly read data due to the shift, thus rendering focusing control essential. This focusing control has been conventionally performed by astigmatic method using astigmatism or a knife edge method.

For focusing control, focusing errors are detected from the laser beam reflected by an optical disk, and focusing control operation is conformed by transferring the objective lens in response to the focusing error signals derived by these focusing error signals. The objective lens is normally the same lens that is used for the tracking control. A focusing actuator is energized to move the lens for the focusing control. When the focusing actuator is deenergized, the lens is held at a mechanically neutral point balanced by a spring force.

The conventional optical pickup actuators are generally classified into actuators of two types in the arrangement of coils. The objective lens is moved in vertical (focusing) direction and horizontal (tracking) direction using an optical pickup actuator. For example, there is one type in which focusing and tracking coils are placed in the orthogonal and parallel directions, respectively. There is the other type in which the two coils are placed in directions which are 45°/45° against an optical axis as in Noiman's cutter head, respectively.

These conventional optical pickup actuators for moving the objective lens in vertical and horizontal directions for focusing and tracking control as shown above are described in U.S. Pat. No. 5,103,438 (issued to Masunaga et al.), U.S. Pat. No. 5,182,738 (issued to Yoshigawa), etc.

As shown in FIGS. 1 and 2, two suspension wires 2 extend in parallel with each other in a horizontal direction. One end of each of the suspension wires 2 is connected to an upstanding wall portion of an actuator base 1. Further, a holder 4 is positioned above the actuator base 1 for supporting an objective lens 3, and the holder 4 is connected to each end of the suspension wires 2. Therefore, the holder 4 is movably supported on the suspension wires 2 in a cantilevered fashion.

Magnets 5A and 5B are fixed to the holder 4. Further, focusing coils 7A and 7B and tracking coils 8A and 8B are mounted on yokes 6A and 6B which stand vertically from the actuator base 1. One magnet 5A confronts the focusing coil 7A and tracking coil 8A, and the other magnet 5B confronts the focusing coil 7B and tracking coil 8B. The combination of the holder 4, the coils 7, 8, the magnets 5, and the suspension wires 2 is generally referred to as an actuator.

With such an actuator, the suspension wires 2 are formed of extremely flexible materials having low elastic modulus so as to insure precise movement of the holder 4 in response to the magnetic forces. Stated differently, in the conventional actuator, a sufficiently high magnetic flux density has not been obtainable, and therefore, the suspension wires 2 have required extremely high flexibility so that the wires 2 do not restrain movement of the holder 4 in response to the generated magnetic attractive force.

According to the optical pickup actuator having the wire type suspension, the laser beam generated from the laser diode is incident on the recording pit, and the laser reflected from the recording pit is received on the photo detector. In consequence, information recorded on the recording pit is read out. The tracking and focusing conditions on the recording pit are detected by the laser beam reflected from the recording pit.

When focusing control is required, a current is supplied to the focusing coils 7A and 7B in clockwise and counterclockwise directions. At that time, electromagnetic force acts in a direction of the support shaft 6 (focusing direction X). Accordingly, the objective lens is axially moved in correspondence with a change in surface level of the optical disc, so that the beam spot follows the recording surface of the disc.

When tracking control is required, a current is supplied to the tracking coils 8A and 8B in one direction or in the reverse direction thereof. At that time, an electromagnetic force acts in an orthogonal direction with the support shaft (tracking direction Y). Accordingly, the beam spot traces the recording tracks in accordance with the eccentricity of the tracks.

Thus, the predetermined currents flow into focusing and tracking coils, which respectively move the holder 4 in the focusing direction X or the tracking direction Y. As a result, the focusing and tracking servos are carried out.

According to the optical pickup actuator having the wire type suspension, the optical pickup actuator is produced through a difficult and precise process in which fine through holes are drilled through the actuator base and yokes and wires are inserted and fixed therethrough. Such a process is a very difficult one, and thus productivity is decreased.

Furthermore, the suspension wire should be made of special materials, i.e., extremely flexible materials having low elastic modulus, and therefore, the manufacturing cost is increased.

SUMMARY OF THE INVENTION

The present invention is intended to overcome the above-mentioned and numerous other disadvantages and deficiencies of the prior art. Therefore, it is an object of the present invention to provide an optical pickup actuator which has a suspension using an elastic member for simplification of the construction and manufacturing process.

To achieve the above object of the present invention, there is provided an optical pickup actuator which comprises:

a supporting part having
a yoke which has a flat bottom and both side walls upwardly bent at both ends thereof; magnets which are oppositely installed on inner surfaces of both side walls, respectively; a laser-penetrating hole made in one portion of the flat bottom; a guide projector made in another portion of the flat bottom; and an elastic member into which the guide projector is inserted; and an objective lens fixing part having
a main body having a flat plate shape which allows for upward and downward movement along both side walls of the yoke; an objective lens installed in a corresponding position with the laser-penetrating hole; a through hole installed in a corresponding position with the projector and penetrated by the guide projector; and focusing control coil portion and tracking control coil portion installed on side walls of the main body;

wherein the objective lens fixing part is provided on a top of the elastic member in a state that the guide projector is inserted into the through hole, so that the objective lens fixing part is to be elastic by the elastic member.

The guide projector has a truncated cone shape of which an outer surface is bent inwardly so that the elastic member can elastically move for tracking and focusing in a stable state.

The elastic member comprises a spring.

A first groove is formed around the guide projector on the bottom of the yoke, into which a lower end of the elastic member is inserted and fixed, so that the elastic member can elastically move for tracking and focusing in a stable state when the lower end is fixed.

The through hole of the objective lens fixing part has a second groove formed around into which an upper end of the elastic member is inserted and fixed, so that the elastic member can elastically move for tracking and focusing in a stable state when the lower end is fixed.

According to the optical pickup actuator, the objective lens fixing part having the objective lens is elastically supported by a spring over the yoke, and tracking and focusing servos are carried out with elastic motion in vertical (focusing) and horizontal (tracking) directions, and thereby the construction of the optical pickup actuator is simplified and the manufacturing process becomes easy.

BRIEF DESCRIPTION OF THE DRAWINGS

The present invention may be better understood and its numerous objects and advantages will be more apparent to those skilled in the art by reference to the accompanying drawings in which.

DESCRIPTION OF THE PREFERRED EMBODIMENTS

Hereinafter, the preferred embodiments of this invention will be described in detail with reference to the accompanying drawing.

Figure 1:
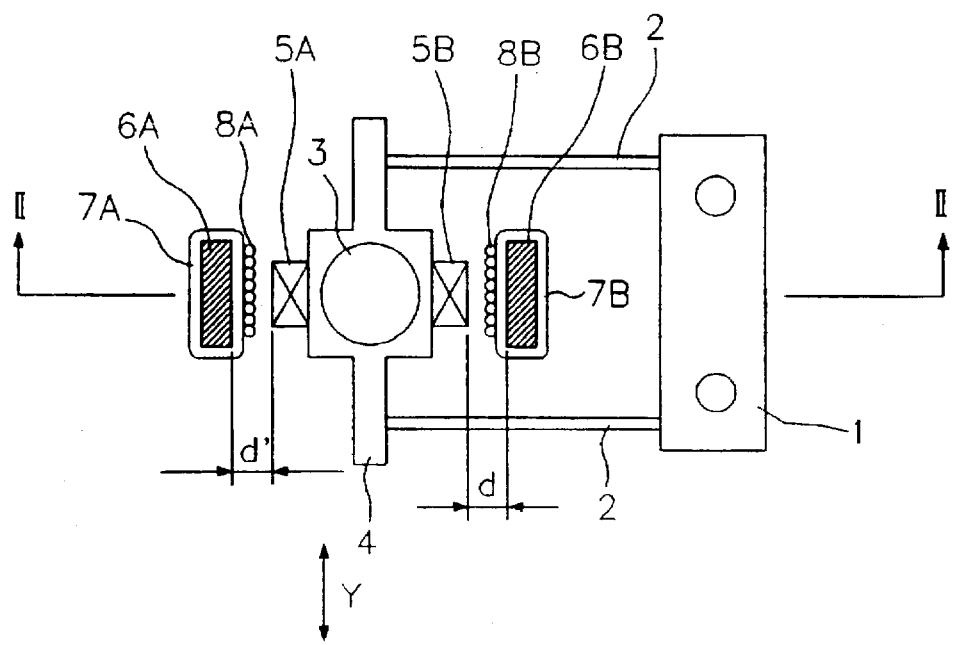
FIG. 1 is a plan view for showing a conventional optical pickup actuator.
Figure 2:
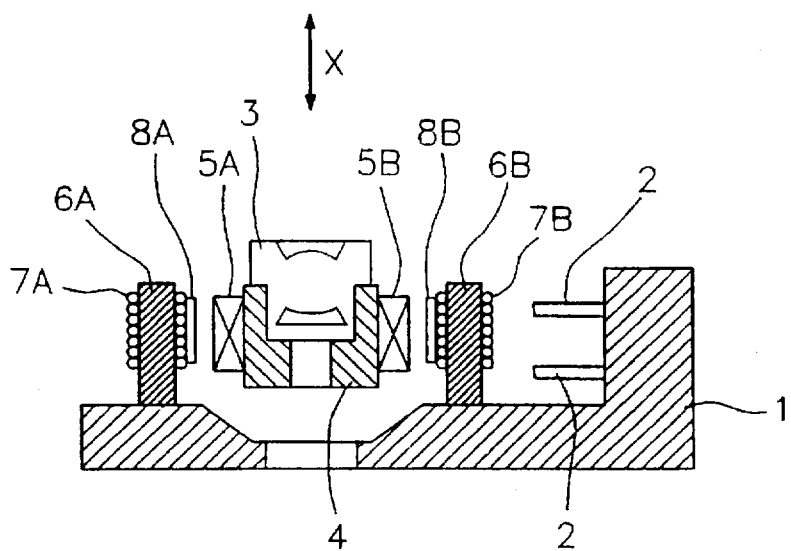
FIG. 2 is a cross-sectional view taken along the line II—II of FIG. 1.
Figure 3:
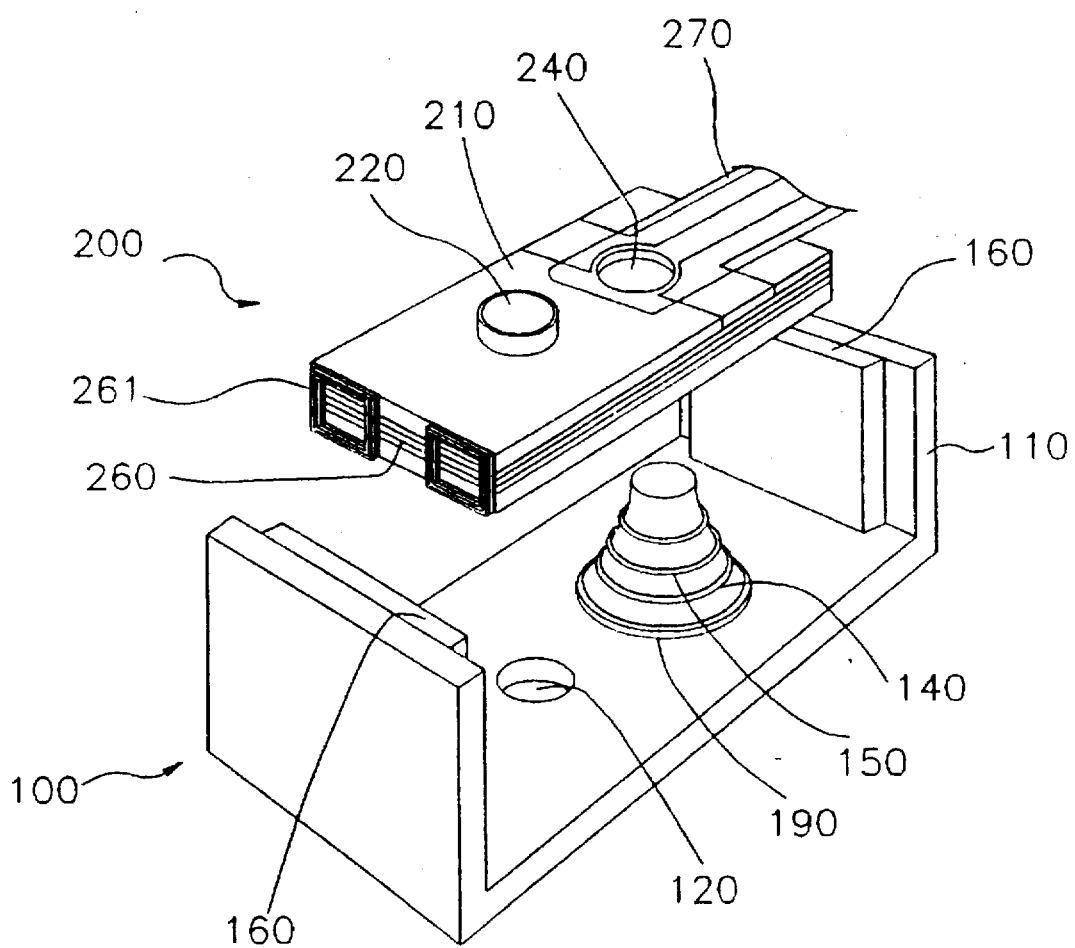
FIG. 3 is a perspective view for showing the optical pickup actuator of the present invention.
Figure 4:
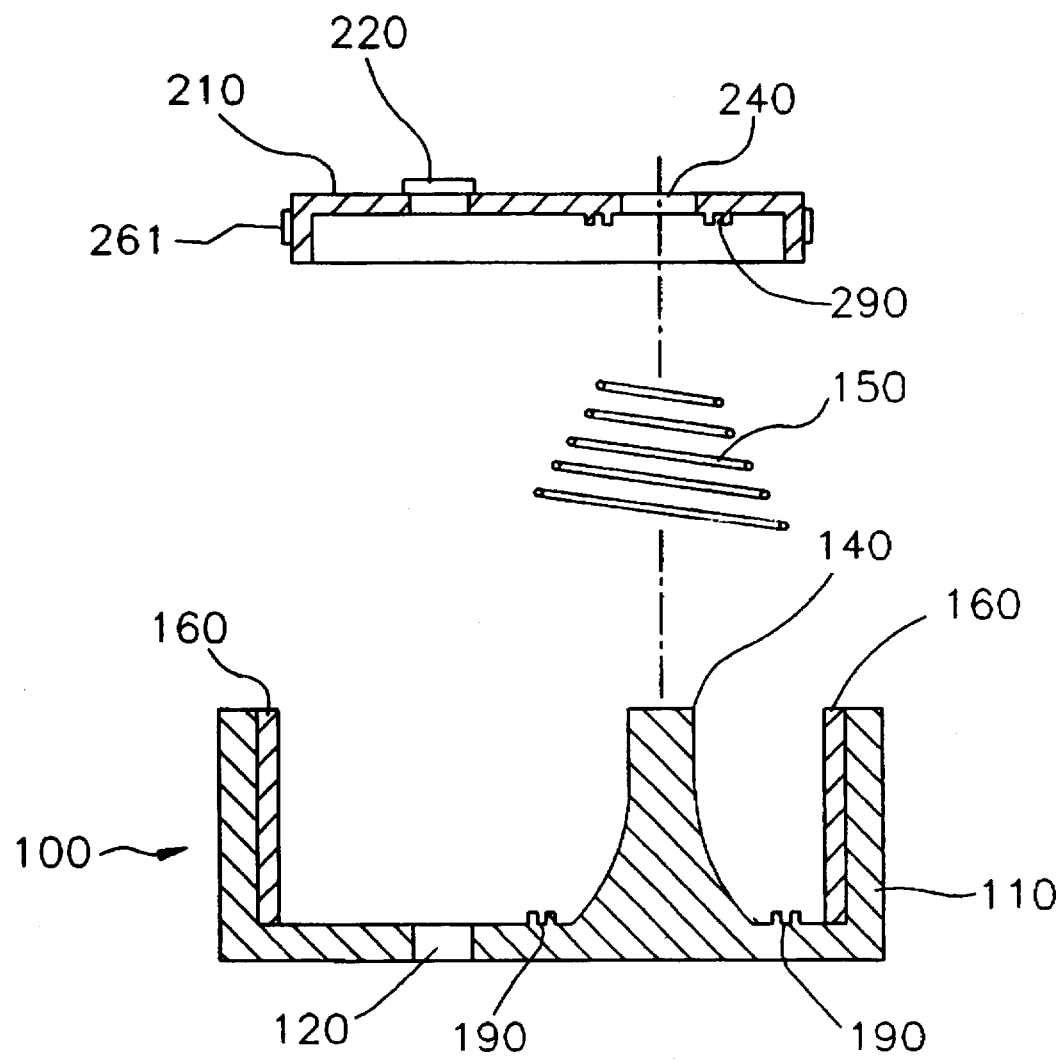
FIG. 4 is a exploded cross-sectional view for showing the optical pickup actuator of FIG. 3.

FIG. 3 is a perspective view showing the optical pickup actuator of the present invention. FIG. 4 is an exploded cross-sectional view showing the optical pickup actuator of FIG. 3.

A yoke 110 of a supporting part 100 has a flat bottom and both side walls upwardly bent at both ends thereof. Magnets 160 are oppositely installed on inner surfaces of both side walls of yoke 110, respectively. A laser-penetrating hole 120 is made in one predetermined portion of the flat bottom. A guide projector 140 is formed in the portion which is symmetric to the portion of laser-penetrating hole 120 of the flat bottom. A spring 150 is put around the guide projector 140. The diameter of the spring 150 from bottom to top gradually becomes smaller. A first groove 190 is formed around the guide projector 140 on the bottom of the yoke 110. A lower end of the spring 150 is inserted and fixed into the first groove 190, so that the spring 150 can elastically move for tracking and focusing in a stable state when the lower end is fixed. The guide projector 140 has a truncated cone shape of which an outer surface is bent inwardly, so that the spring 150 can elastically move for tracking and focusing in the stable state.

An objective lens fixing part 200 has a main body having a flat plate shape. An objective lens 220 is installed in a corresponding position with the laser-penetrating hole 120 on the main body. A through hole 240 is installed in a corresponding position with the projector 140. The through hole 240 is penetrated by the guide projector 140. A second groove 290 is formed around the through hole 240 of the objective lens fixing part 200. An upper end of the spring 150 is inserted and fixed into the second groove 290, so that the objective lens fixing part 200 can be elastically supported by the spring 150 in the stable state when the lower end is fixed. A focusing control coil 260 is wound around the side walls of the main body 210. When the current is applied to the focusing control coil 260, the electromagnetic force is biased in a vertical direction (focusing direction). Furthermore, a tracking control coil 261 is installed on side walls of the main body 210. When the current is applied to the tracking control coil 261, the electromagnetic force is biased in a horizontal direction (tracking direction). A PCB 270 is connected to the objective lens fixing part 200 for transferring input and output signals to the focusing and tracking coils 260 and 261 in case that the focusing and tracking controls are needed.

Hereinafter, an operation of the optical pickup of the present invention will be described.

As shown in FIG. 3, in the state that the objective lens fixing part 200 is elastically supported by the spring 150 fixed on the yoke 110 of the supporting part 100, a laser beam goes through the objective lens 220 via the laser penetrating hole 120 from below. The laser beam is focused on a recording pit to be reflected. The reflected laser beam is returned to the objective lens 220 and the laser penetrating hole 120. After that, the beam is received on a photodetector (not shown) via the predetermined optics (not shown). Focusing and tracking conditions of the recording pit are detected by the received beam.

When focusing servo is required, a focusing control current is supplied to the focusing coil 260 via PCB 270 from a servo system (not shown). At that time, since the focusing control coil 260 is wound around the side walls of the main body 210 in parallel with the surface of the main body 210, an electromagnetic force acts in a vertical direction against the surface of the main body 210. Accordingly, the objective lens 220 and the objective lens fixing part 200 are forced in a vertical direction, and thereby the focusing servo is carried out.

When tracking servo is required, a tracking control current is supplied to the tracking coil 261 via PCB 270 from a servo system (not shown). At that time, since the tracking control coil 261 is wound vertical to the surface of the main body 210 at the side walls of the main body 210, an electromagnetic force acts in a parallel direction with the surface of the main body 210. Accordingly, the objective lens 220 and the objective lens fixing part 200 is forced in a horizontal direction, and thereby the tracking servo is carried out.

According to the optical pickup actuator, the objective lens fixing part having the objective lens is elastically supported by a spring over the yoke, and tracking and focusing servos are carried out with elastic motion in vertical (focusing) and horizontal (tracking) directions, and thereby the construction of the optical pickup actuator is simplified and the manufacturing process becomes easy.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An optical pickup actuator with an objective lens fixing part suspended by an elastic member which comprises:
    a supporting part having
        a yoke which has a flat bottom and both side walls upwardly bent at both ends thereof; magnets which are oppositely installed on inner surfaces of both of the side walls, respectively; a laser-penetrating hole made in one portion of the flat bottom; a guide projector made in another portion of the flat bottom; an elastic member into which the guide projector is inserted; and a first groove formed around the guide projector on the bottom of the yoke into which a lower end of the elastic member is inserted and fixed;
    an objective lens fixing part having
        a main body having a flat plate shape for upwardly and downwardly moving along both side walls of the yoke; an objective lens installed in a corresponding position with the laser-penetrating hole; a through hole installed in a position corresponding with the projector and penetrated by the guide projector; and a focusing control coil portion and a tracking control coil portion installed on side walls of the main body,
    wherein the objective lens fixing part is suspended by the elastic member in a state that the guide projector is inserted into the through hole, so that the objective lens fixing part has elasticity by the elastic member.

2. The optical pickup actuator as claimed in claim 1, wherein the elastic member comprises a spring.

3. The optical pickup actuator as claimed in claim 2, a diameter of the spring from bottom to top gradually becomes smaller.

4. The optical pickup actuator as claimed in claim 1, wherein the guide projector has a truncated cone shape of which an outer surface is bent inwardly so that the elastic member is movable elastically for tracking and focusing in a stable state.

5. An optical pickup actuator with an objective lens fixing part suspended by an elastic member which comprises:
    a supporting part having
        a yoke which has a flat bottom and both side walls upwardly bent at both ends thereof; magnets which are oppositely installed on inner surfaces of both of the side walls, respectively; a laser-penetrating hole made in one portion of the flat bottom; a guide projector made in another portion of the flat bottom; and an elastic member into which the guide projector is inserted;
    an objective lens fixing part having
        a main body having a flat plate shape for upwardly and downwardly moving along both side walls of the yoke; an objective lens installed in a corresponding position with the laser-penetrating hole; a through hole installed in a position corresponding with the projector and penetrated by the guide projector; and a focusing control coil portion and a tracking control coil portion installed on side walls of the main body, and a second groove formed around the through hole of the objective lens fixing part into which an upper end of the elastic member is inserted and fixed,
    wherein the objective lens fixing part is suspended by the elastic member in a state that the guide projector is inserted into the through hole, so that the objective lens fixing part has elasticity by the elastic member.

6. The optical pickup actuator as claimed in claim 5, wherein the elastic member comprises a spring.

7. The optical pickup actuator as claimed in claim 6, wherein a diameter of the spring from bottom to top gradually becomes smaller.

8. The optical pickup actuator as claimed in claim 5, wherein the guide projector has a truncated cone shape of which an outer surface is bent inwardly so that the elastic member is movable elastically for tracking and focusing in a stable state.

9. An optical pickup actuator which comprises:
    a supporting part having
        a yoke which has a flat bottom and both side walls upwardly bent at both ends thereof; magnets which are oppositely installed on inner surfaces of both of the side walls, respectively; a laser-penetrating hole made in one portion of the flat bottom; a guide projector made in another portion of the flat bottom; an elastic member into which the guide projector is inserted; and a first groove formed around the guide projector on the bottom of the yoke into which a lower end of the elastic member is inserted and fixed; and
    an objective lens fixing part having
        a main body having a flat plate shape for upwardly and downwardly moving along both side walls of the yoke; an objective lens installed in a position corresponding with the laser-penetrating hole; a through hole installed in a position corresponding with the projector and penetrated by the guide projector; and focusing control coil portion and tracking control coil portion installed on side walls of the main body; and a second groove formed around the through hole into which an upper end of the elastic member is inserted and fixed, wherein the objective lens fixing part is provided on a top of the elastic member in a state that the guide projector is inserted into the through hole, so that the objective lens fixing part is to be elastic by the elastic member.

10. An optical pickup actuator which comprises:

a supporting part having a yoke which has a flat bottom and both side walls upwardly bent at both ends thereof; magnets which are oppositely installed on inner surfaces of both of the side walls, respectively; a laser-penetrating hole made in one portion of the flat bottom; a guide projector upwardly projected in another portion of the flat bottom, the guide projector having a truncated cone shape of which outer surface is bent inwardly; an elastic member into which the guide projector is inserted; and a first groove formed around the guide projector on the bottom of the yoke into which a lower end of the elastic member is inserted and fixed; and an objective lens fixing part having a main body having a flat plate shape for upwardly and downwardly moving along both side walls of the yoke; an objective lens installed in a position corresponding with the laser-penetrating hole; a through hole installed in a position corresponding with the projector and penetrated by the guide projector; and focusing control coil portion and tracking control coil portion installed on side walls of the main body; and a second groove formed around the through hole into which an upper end of the elastic member is inserted and fixed, wherein the objective lens fixing part is provided on a top of the elastic member in a state that the guide projector is inserted into the through hole, so that the objective lens fixing part is to be elastic by the elastic member.

* * * * *